Patented Nov. 25, 1930

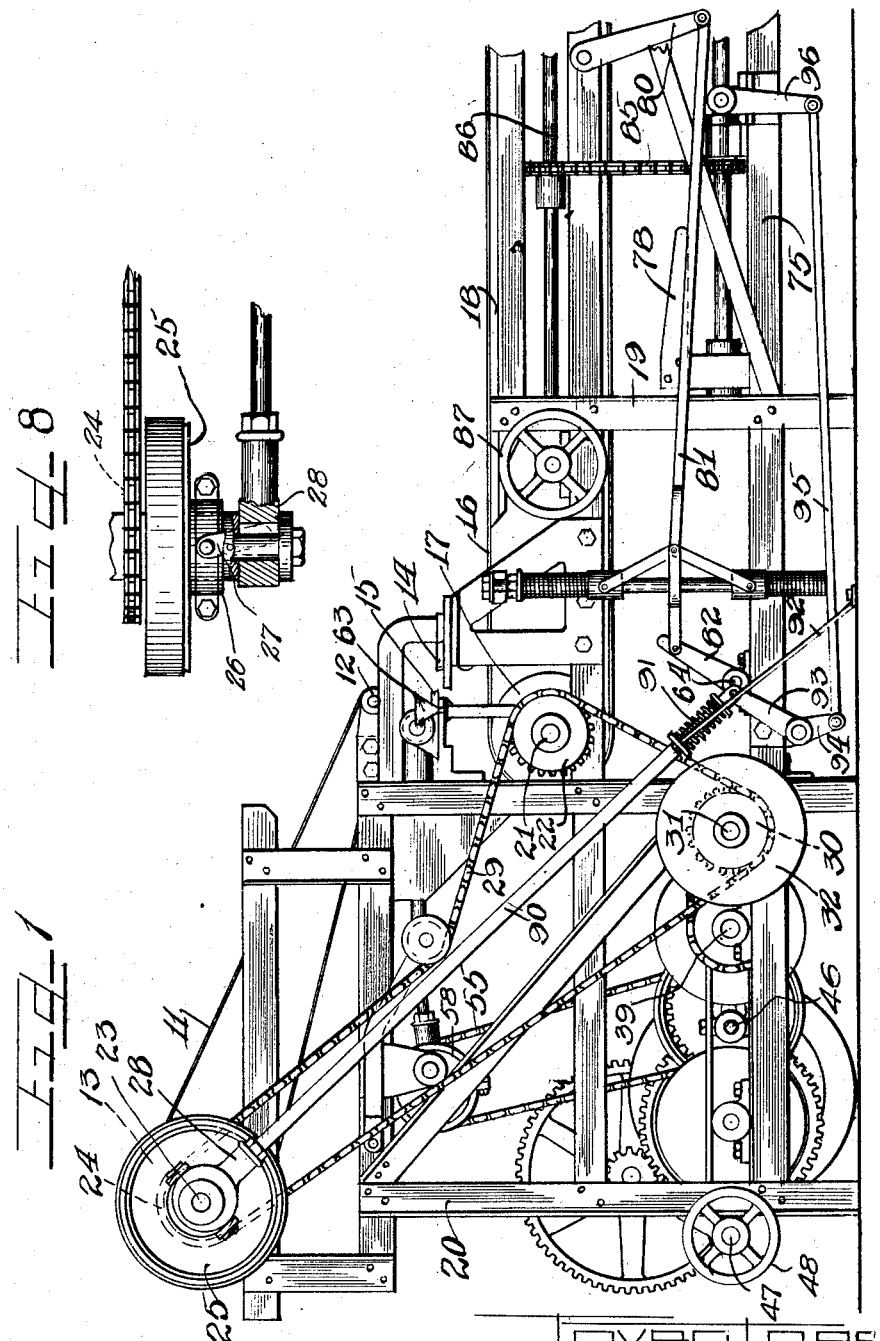

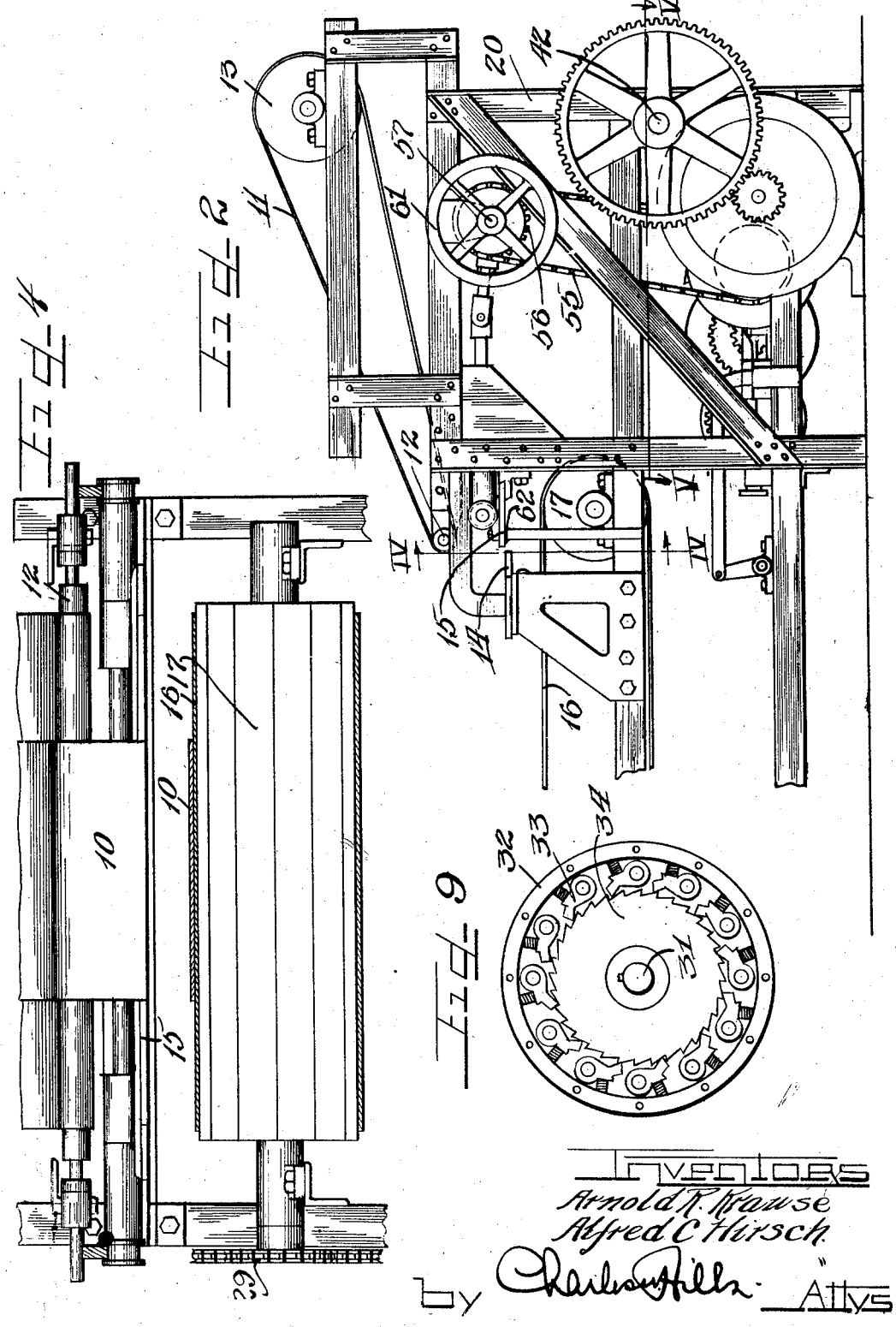

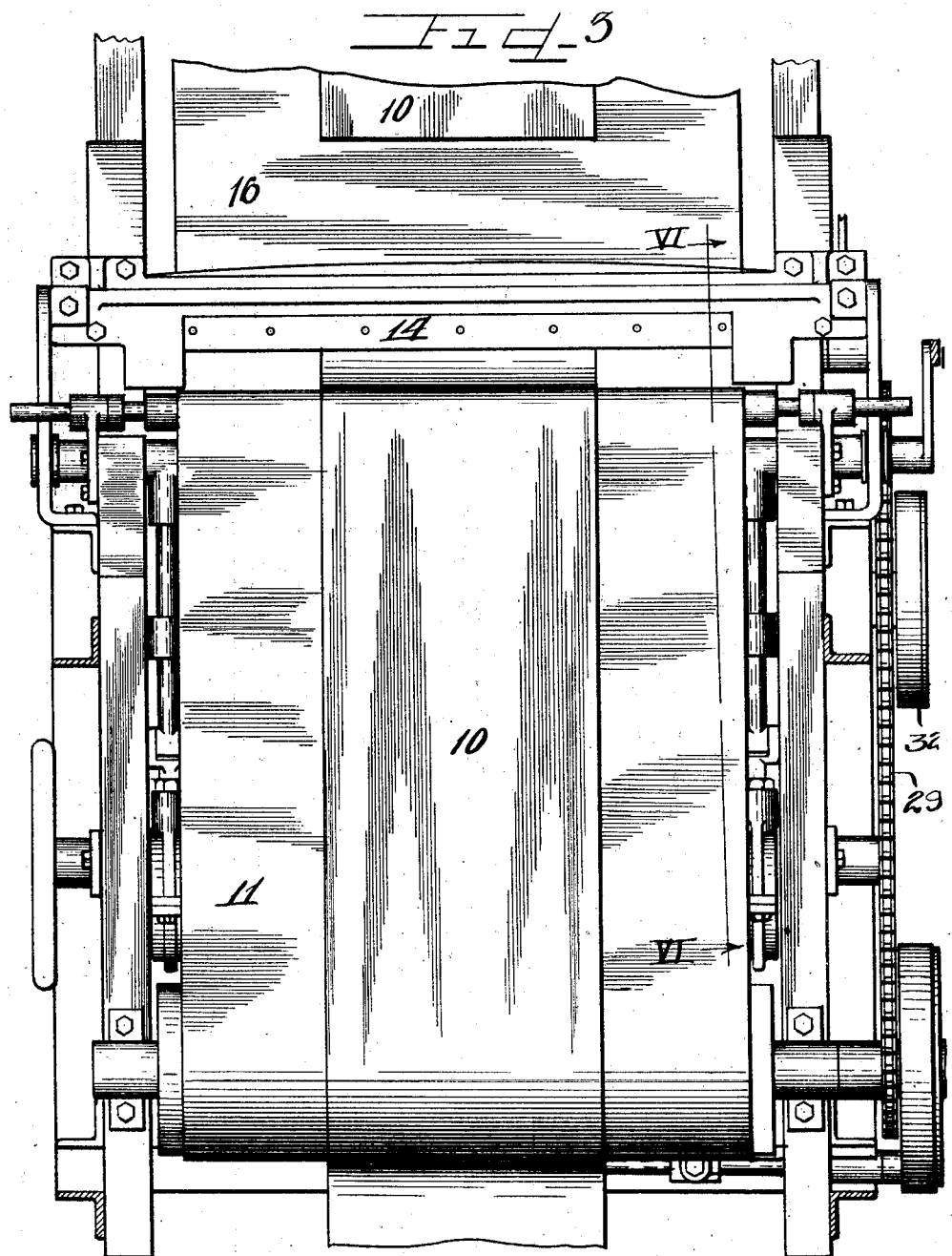

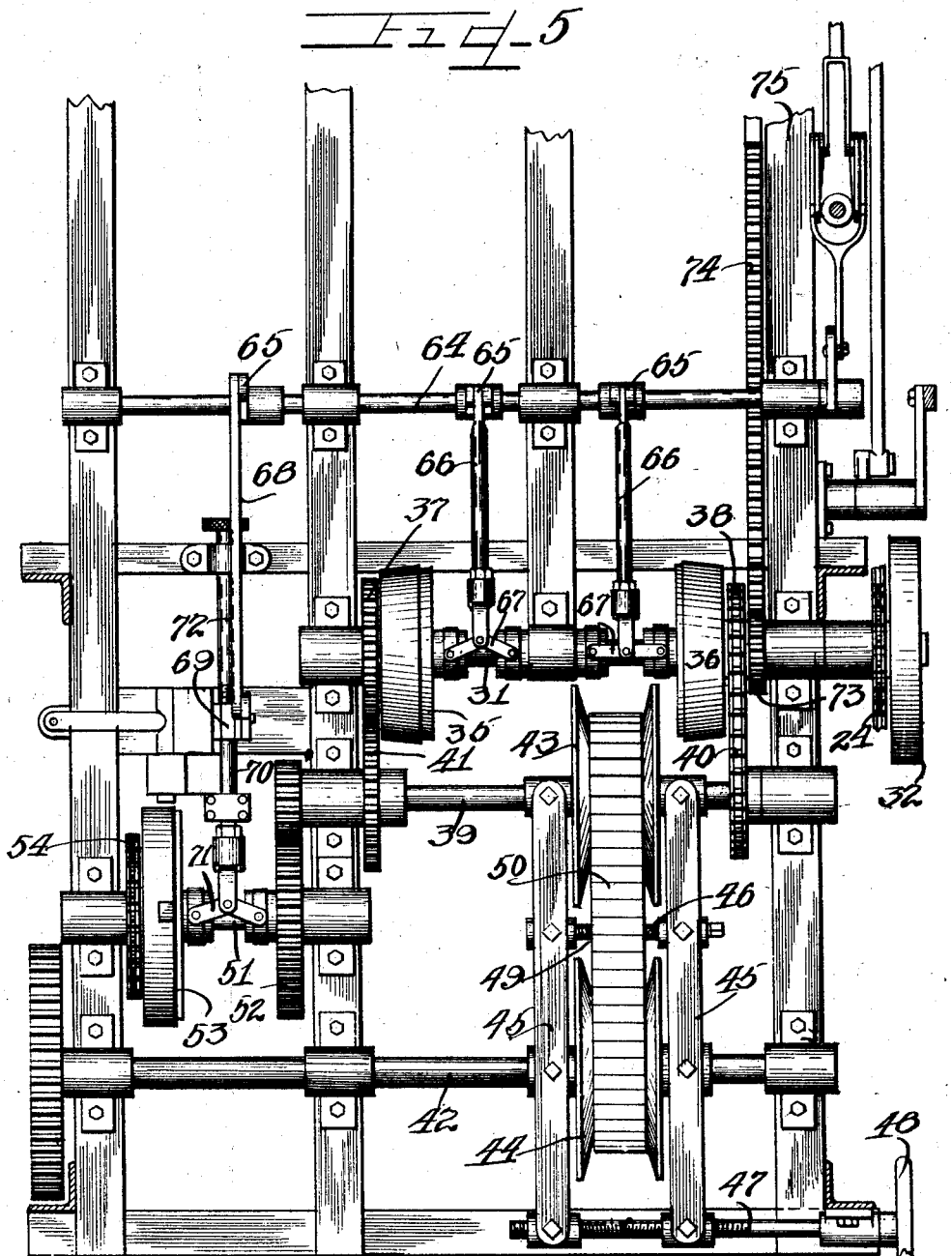

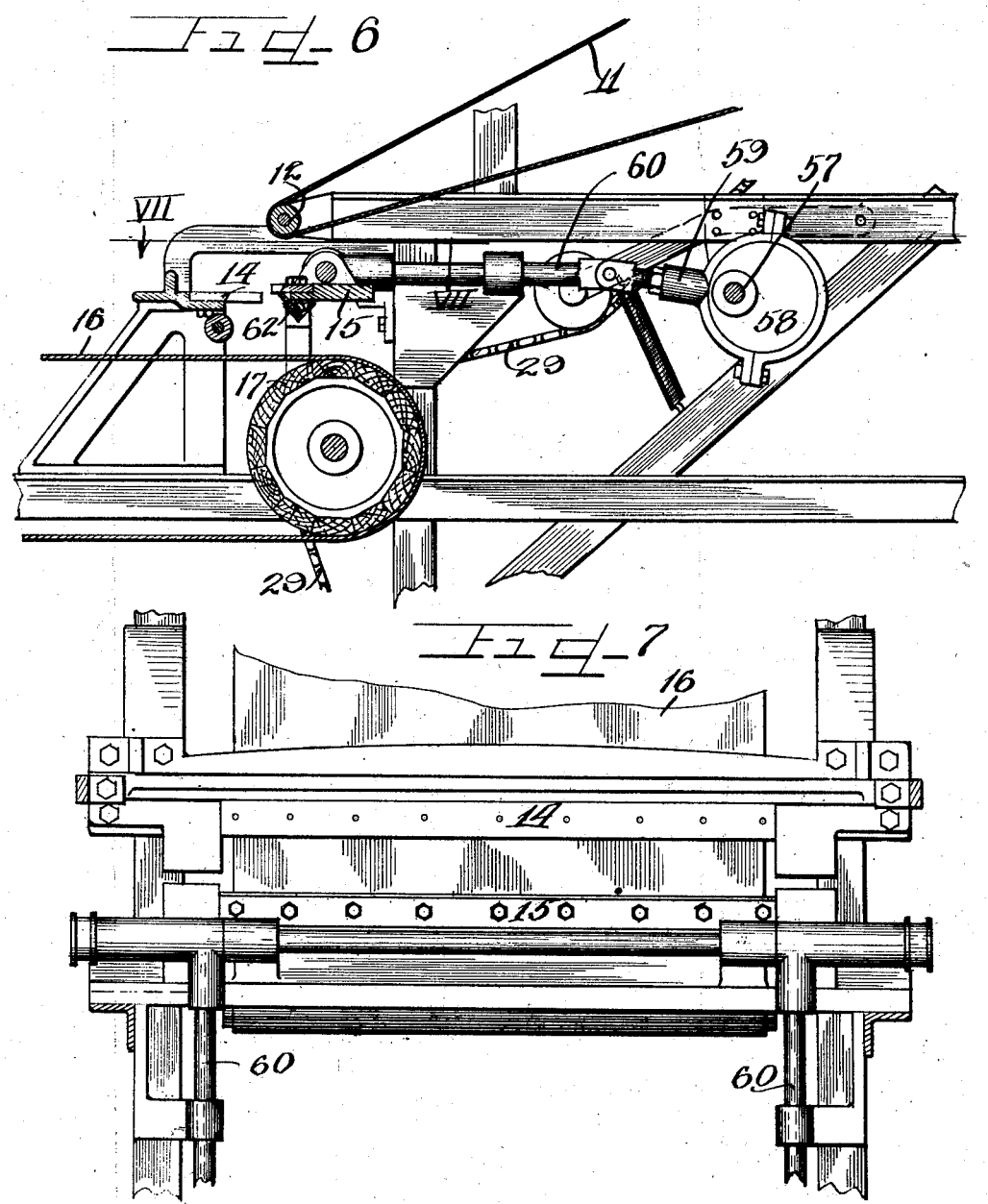

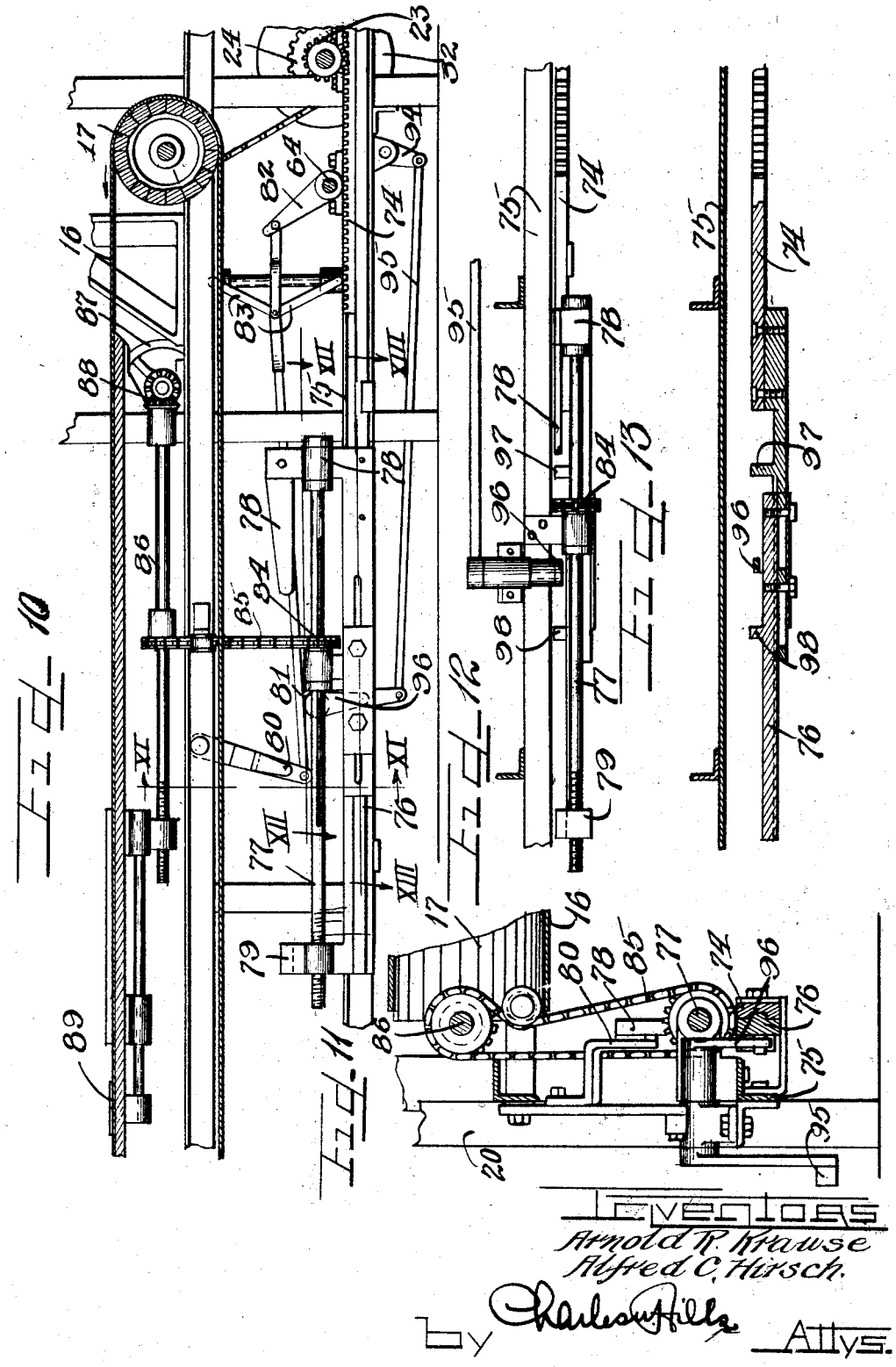

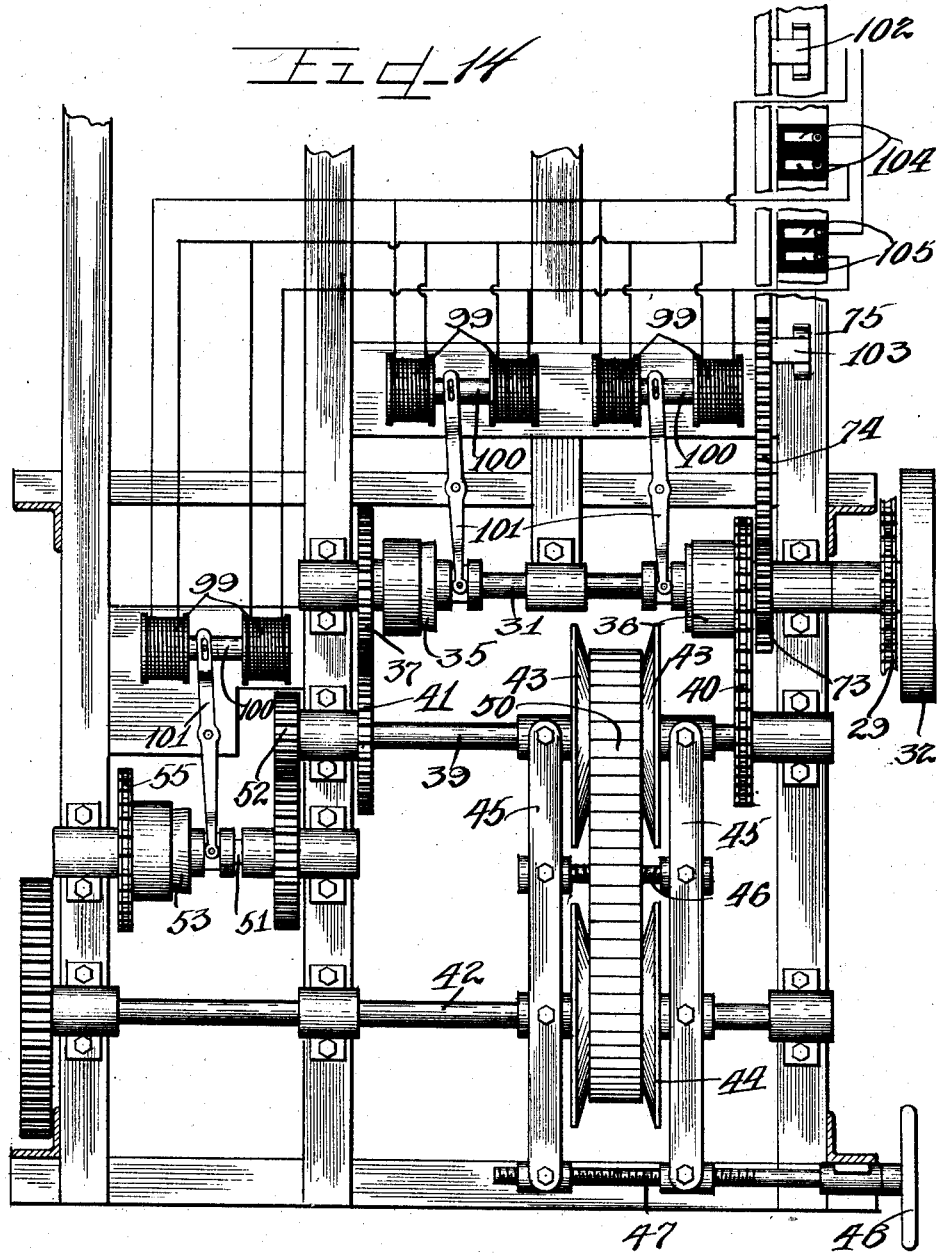

1,782,658

UNITED STATES PATENT OFFICE

ARNOLD R. KRAUSE AND ALFRED C. HIRSCH, OF EAU CLAIRE, WISCONSIN, ASSIGNORS TO GILLETTE RUBBER COMPANY, OF EAU CLAIRE, WISCONSIN, A CORPORATION OF WISCONSIN

TUBE-STOCK FEEDING, MEASURING, AND CUTTING MACHINE

Application filed June 22, 1927. Serial No. 200,563.

This invention relates to a tube stock measuring, feeding and cutting machine for measuring and cutting raw tube stock prior to rolling on mandrels for the vulcanizing operation.

It is an object of this invention to provide a machine of the class described adapted to sever the tube stock into the required lengths and to provide a working table where the valve patches can be applied and the stock rolled onto mandrels as a part of a substantially continuous process, thus increasing the production of tubes with a decrease in the labor and space required. In the manufacture of inner tubes for pneumatic tires, the raw tube stock is taken off the rolls of a rubber mill in the required width and is then cut into individual lengths, a tire valve patch being added and the stock rolled onto a tubular mandrel which carries the tube during the vulcanizing operation, the tube being then stripped from the mandrel and spliced. The present invention provides mechanism for intermittently feeding a predetermined length of raw tube stock up to and between the blades of a shear, the severed stock being run out onto a horizontal conveyor which serves as a work table for rolling the stock onto the mandrels. The horizontal conveyor which serves as a work table is driven in synchronism with the feeding or measuring mechanism in order to avoid stretching of the stock, but in order to provide working space between adjacent lengths of stock, the work table is given additional travel after the shears are operated by providing a clutch for the feeding mechanism which is automatically controlled to produce the desired over-travel between the feeding periods.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of the measuring mechanism of this invention with a fragmentary part of the delivery conveyor upon which the operation of rolling the tube stock on the mandrel is preformed.

Figure 2 is an elevation of the reverse side of the measuring mechanism of Figure 1.

Figure 3 is a top plan view thereof.

Figure 4 is a vertical section on the line IV—IV of Figure 2.

Figure 5 is a horizontal section on the line V—V of Figure 2.

Figure 6 is a vertical section on the line VI—VI of Figure 3.

Figure 7 is a horizontal section on the line VII—VII of Figure 6.

Figure 8 is a fragmentary detail, partly in section, of the clutch drive for the measuring belt.

Figure 9 is an elevation of the one way clutch drive for the conveyor with the cover removed.

Figure 10 is a fragmentary longitudinal vertical section of the conveyor showing the automatic controls therefor.

Figure 11 is a fragmentary section of the adjustable control taken on the line XI—XI of Figure 10.

Figure 12 is a section on the line XII—XII of Figure 10.

Figure 13 is a section on the line XIII—XIII of Figure 10.

Figure 14 is a section corresponding to Figure 5, disclosing a modified form of electrical control.

As shown on the drawings:

A substantially continuous length of raw tube stock 10 of the required width is lead over the upper end of an inclined feeding and measuring belt 11, shown at the left of Figure 1. This belt runs over a large driving pulley 13 and a small pulley 12. The end of the tube stock 10 passes over the belt and pulley 13 and drops straight down between the stationary and movable blades 14 and 15 of a shear, and is picked up by a long horizontal conveyor belt 16 running over a driving pulley 17. This belt 16 is supported by a table-like surface 18 on the framework 19 which forms a continuation of the framework 20 supporting the pulleys 12 and 13, the details of this framework being unimportant, as it is simply a foundation structure built up of angle iron to provide the required journal supports.

The pulley 17 is mounted on a shaft 21 having a chain sprocket 22 thereon, while the pulley 13 is mounted on a shaft 23 which carries a chain sprocket 24 rotatably mounted thereon together with a clutch mechanism 25 with a shift collar 26 and toggle levers 27 operated by a sliding member 28 as shown in Figure 8, the chain sprocket 24 being clutched to the shaft when the member 28 is pushed to the left in this figure. The two chain sprockets 22 and 24 form part of a triangular drive by a chain 29 from a sprocket 30 on a reversing shaft 31, the sprocket 30 having a one-way drive therefrom through a pawl and ratchet type clutch 32 shown in Figure 9, a series of unequally spaced pawls 33 engaging a ratchet 34 keyed to the shaft 31, the unequal spacing of the pawls being provided to reduce the lost motion before the clutch engages, as this clutch operates the feeding belt 11 and therefore must be accurately controlled to produce uniform lengths of cut stock.

The reversing drive for the shaft 31 comprises a pair of clutch members 35 and 36 revolving with the shaft 31 and alternately clutching a gear 37 and a chain sprocket 38; both the gear and sprocket being driven from a common continuously rotating lay shaft 39, so that the chain 40 and gear 41 afford drives for the shaft 31 in either direction of rotation, although the triangular chain drive 29 is energized in only one direction because of the ratchet clutch 32.

The lay shaft 39 is driven from the main power shaft 42 by a variable speed drive comprising two pairs of opposed conical pulleys 43 and 44 having a sliding movement on both shafts, the hubs of one pulley of each pair being connected by a bar 45 on each side, both bars being fulcrumed together mid-way between the two pairs of pulleys by an adjustable spacer bar 46. The projecting ends of the bars 45 carry nuts threaded on a right and left handed screw shaft 47 operated by a hand wheel 48, the turning of which moves one pair of pulleys together to the same extent that the other pair of pulleys are moved apart. The drive from the pulley on the main shaft 42 to the pulleys on the lay shaft 39 is by means of a belt 49 to which blocks 50 are fastened, the ends of the blocks taking the driving force and riding up or out on the surfaces of the conical pulleys to vary the speed ratio according to the spacing adjustment thereof.

The lay shaft 39 drives a countershaft 51 by means of gears 52, the countershaft carrying a clutch 53 which intermittently engages a chain sprocket 54, the chain 55 leading to sprocket 56 on a shaft 57 which carries a pair of eccentrics 58. Connecting rods 59 on the eccentrics 58 reciprocate rods 60 connected to the movable shear blade 15. A hand wheel 61 is applied to the shaft 57 in order that the cut can be completed after shutting down the machine.

As rubber cuts easiest with a wet blade, the blade 15 is arranged to slide over a wet felt carried in a trough 62 which is filled through a funnel 63 on the side of the frame.

The controls for the reversing clutches 35 and 36 and the shear clutch 53 are operated by a single rocking shaft 64 having cranks 65 with links 66 leading to toggle levers 67 for each of the clutches 35 and 36, a similar link 68 leading to a crosshead 69 and thence by a rod 70 to toggle levers 71 operating the clutch 53, the rod 70 being threaded in the crosshead and adjustable by means of the knob and threaded shaft 72 shown in Figure 5.

The shaft 31 carries a pinion 73 meshing with a rack 74 which is reciprocated back and forth by the alternating drive for the shaft 31. The rack slides in suitable guideways on a frame member 75, the end of the rack carrying an adjustable extension member 76 which is adjusted by a threaded shaft 77 journaled in a trip member 78 and threaded into a second trip member 79, both trip members engaging a pivoted dog 80 which is linked at 81 to a lever 82 on the rocking shaft 64. A snap-over mechanism 83 is interposed in the link 81 to insure engagement of the proper clutch controlled by the movement of the shaft 64.

The length of stroke of the rack 74 and consequently the length of stock fed at a cycle, is governed by the distance between the two trip members 78 and 79, the adjustment of this distance being accomplished by screwing up or unscrewing the threaded shaft 77. In order that this shaft may be adjusted while the machine is in operation, a sprocket 84 is splined on the shaft 77 which slides back and forth therethrough, the sprocket being rotated by a chain 85 leading to a shaft 86 which is operated by a hand-wheel 87 on the side of the frame through bevel gears 88. In order that the operator may have visible means for determining the proper adjustment, an indicator or pointer 89 is advanced and retracted by the rotation of the shaft 86, this pointer preferably being located at the end of the cut-off length of stock when the belt 16 comes to rest between cycles to permit the stock to be rolled onto mandrels which have ends projecting beyond the tube stock.

The clutch mechanism 25 previously described in connection with the feed roll 13 is engaged by the sliding member 28 which is operated by a rod 90 normally yieldingly held retracted by the spring 91 and the rods 92. The rod 90 is operated by a crank 93 which in turn is operated by a crank 94 and link 95 leading to a pivoted dog 96 which is engaged by trips 97 and 98 on the side of the rack 74 and the extension member 76. The purpose of this dog 96 and the trips separate from the reversing mechanism is to provide for overrunning the horizontal conveyor before the feeding mechanism starts to measure off the required quantity of stock for the next operation, so that the trip 97 gives a predetermined dwell before the feed mechanism engages this trip begin low enough to pass under the dog 96 after tripping the same on the outer stroke of the rack, the second trip 98 being higher to release the clutch 25 upon the return stroke of the rack.

Attention is directed to the fact that the chain 55 and the associated mechanism for operating the shear blade 15 are so timed as to impart only a single revolution to the eccentrics 58 whereby the rods 60 are only caused to make one complete reciprocation during the time that the conveying belts are inactive.

The modified form of clutch mechanisms shown in Figure 14 operates to produce the same sequence of steps as in the form previously described, the mechanical clutch operating linkage being replaced by opposed pairs of solenoids 99, the cores 100 of which operate levers 101 controlling the three clutches previously described, and the rack 74 carrying electrical contact members 102 and 103 which bridge pairs of electrical contacts 104 and 105 at either end of the movement of the rack bar 74. The wiring diagram for the circuits is given in Figure 14.

The operation is as follows:

When a strip of stock 10 is in position on the feeding belt 11 and the driving power is applied, the rack 74 is run inwardly until the trip 98 trips the dog 96, engaging the clutch 25 which causes the feed roller 13 to move the feeding belt 11 a predetermined distance during the continued inward movement of the rack 74 caused by a clockwise rotation of the shaft 31 which drives the chain 29 through the one way clutch 32. When the rack 74 reaches its extreme inner position, the trip 79 engages the dog 80 which throws out the one of the clutches 35 or 36 which is the driver when the shaft rotates clockwise, the other clutch, as well as the shear clutch 53 being simultaneously engaged so that the material is cut off while the rack is being run out to its extreme position, the horizontal conveyor 16 being stationary during this period to permit the subsequent operations of applying the valve patch and rolling the previously cut off strip of stock onto a mandrel. When the rack reaches its extreme position and reverses, the clutches are again reversed by tripping the dog 80 and the conveyor 16 operates for a predetermined distance before the trip 98 again actuates the dog 96 to engage the feed mechanism. With this arrangement, the conveyor 16 is long enough to receive two lengths of cut-off stock at one time, the length farthest from the feeding mechanism being the one that is rolled onto a mandrel.

It will thus be seen that we have produced an improved stock measuring and cutting machine that is automatic in operation and that combines hitherto separate operations into overlapping ones at a great saving in time and labor, as measuring, cutting and preparing for vulcanizing can be accomplished as a single process, the raw stock being received directly from the mixing mills without intermediate handling or storage.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. A stock measuring, cutting and conveying mechanism comprising measuring and receiving conveyors, a cut off mechanism interposed between said conveyors, and intermittent driving mechanisms therefor including a reciprocating rack, and means associated with said rack adapted to control the operation of said intermittent driving mechanisms.

2. A stock measuring, cutting and conveying mechanism comprising measuring and receiving conveyors, a cut off mechanism interposed between said conveyors, and intermittent driving mechanisms therefor including an adjustable stroke reciprocating rack, and means associated with said rack adapted to control the operation of said intermittent driving mechanisms.

3. A stock measuring, cutting and conveying mechanism comprising measuring and receiving conveyors, a cut off mechanism interposed between said conveyors, intermittent driving mechanisms therefor including a reciprocating rack, means associated with said rack adapted to control the operation of said intermittent driving mechanisms, and means associated with the measuring conveyor adapted to shorten the period of movement thereof relative to the period of movement of the receiving conveyor.

4. A stock measuring, cutting and conveying mechanism comprising measuring and receiving conveyors, a cut off mechanism interposed between said conveyors, and intermittent driving mechanisms therefor including an intermittently reversible driving shaft, a triangular one-way drive therefrom to said measuring and receiving conveyors, and an intermittent drive for said cutting mechanism operating in synchronism with the reverse movement of said reversing driving shaft.

5. A stock measuring, cutting and conveying mechanism comprising measuring and receiving conveyors, a cut off mechanism interposed between said conveyors, and intermittent driving mechanisms therefor including an intermittently reversible driving shaft, a triangular one-way drive therefrom to said measuring and receiving conveyors, an intermittent drive for said cutting mechanism operating in synchronism with the reverse movement of said reversing driving shaft, and means associated with the measuring conveyor adapted to shorten the period of movement thereof relative to the period of movement of the receiving conveyor.

6. In a machine of the class described, means adapted to intermittently feed a predetermined length of stock, severing means adapted to cut off lengths of said stock, receiving means for the cut off lengths of stock, mechanism for intermittently advancing said receiving means in synchronism with the intermittent feeding means, and means associated with said feeding means adapted to start said feeding means after a predetermined movement of said receiving means whereby the latter is caused to over-run the feeding means to provide spaces between adjacent cut-off lengths of stock.

7. In a machine of the class described, stock measuring and cutting mechanism, a receiving conveyor for the cut-off lengths of stock, interconnected intermittent driving mechanisms therefor including clutches, a reciprocating rack, and means contacted by said rack adapted to operate said clutches in timed relationship.

8. In a machine of the class described, stock measuring and cutting mechanism, a receiving conveyor for the cut-off lengths of stock, interconnected intermittent driving mechanisms therefor including clutches, a reciprocating rack and clutch control members adapted to be intermittently operated by the movement of said rack, and means contacted by said rack adapted to operate said clutches in timed relationship.

9. In a machine of the class described, stock measuring and cutting mechanism, a receiving conveyor for the cut-off lengths of stock, interconnected intermittent driving mechanisms therefor including clutches, a reciprocating rack, means adapted to vary the stroke of said rack, and means contacted by said rack adapted to operate said clutches in timed relationship.

10. In a machine of the class described, stock measuring and cutting mechanism, a receiving conveyor for the cut-off lengths of stock, interconnected intermittent driving mechanisms therefor including clutches, a reciprocating rack, and clutch control members adapted to be intermittently operated by the movement of said rack, means adapted to vary the stroke of said rack, and means contacted by said rack adapted to operate said clutches in timed relationship.

11. Tube making apparatus comprising means for feeding forward a continuous strip of sheeted rubber stock to a receiving position, means for feeding to a tube rolling position, means for feeding to a tube rolling position successive blanks severed from the continuous strip at the severing position, means for automatically severing the portion of the strip fed from the delivery end of said first feeding means during periods of time when both of said feeding means are inoperative, the second feeding means being arranged to step each blank ahead of the next as it feeds the blank from the severing position and to support the blanks successively in position for the rolling of the mandrels thereon, and a single rack for alternately setting into operation the severing means and said second feeding means.

12. Tube making apparatus comprising means for feeding forward a continuous strip of sheeted rubber stock to a receiving position, means for feeding to a tube rolling position successive blanks severed from the continuous strip at the severing portion, means for automatically severing the portion of the strip fed from the delivery end of said first feeding means during periods of time when both of said feeding means are inoperative, the second feeding means being arranged to step each blank ahead of the next as it feeds the blank from the severing position and to support the blanks successively in position for the rolling of the mandrels thereon, and a single rack for alternately setting into operation the severing means and said second feeding means, said rack also serving to operate the first feeding means in intermittent movements of the same speed as those of the second feeding means but each so timed as to start after and continue concurrently with the movement of the second feeding means.

13. Tube making apparatus comprising means for feeding forward a continuous strip of sheeted rubber stock to a receiving position, means for feeding to a tube rolling position successive blanks severed from the continuous strip at the severing position, means for automatically severing the portion of the strip fed from the delivery end of said first feeding means during periods of time when both of said feeding means are inoperative, the second feeding means being arranged to step each blank ahead of the next as it feeds the blank from the severing position and to support the blanks successively in position for the rolling of the mandrels thereon, and clutches for operating said severing means and said second feeding means and a single rack for alternately operating said clutches.

14. Tube making apparatus comprising means for feeding forward a continuous strip of sheeted rubber stock to a receiving position, means for feeding to a tube rolling position successive blanks severed from the continuous strip at the severing position, means for automatically severing the portion of the strip fed from the delivery end of said first feeding means during periods of time when both of said feeding means are inoperative, the second feeding means being arranged to step each blank ahead of the next as it feeds the blank from the severing position and to support the blanks successively in position for the rolling of the mandrels thereon, and clutches for operating said severing means and said feeding means, a single rack associated therewith, and trip mechanism operable by said rack for alternately engaging and disengaging said clutches.

In testimony whereof, we have hereunto subscribed our names.

ARNOLD R. KRAUSE.
ALFRED C. HIRSCH.